T864021

DEFENSIVE PUBLICATION

UNITED STATES PATENT OFFICE

Published at the request of the applicant or owner in accordance with the Notice of Apr. 11, 1968, 849 O.G. 1221. Identification is by serial number of the application and the heading indicates the number of pages of specification, including claims, and of sheets of drawing contained in the application as originally filed. The file of this application is available to the public for inspection; reproduction may be purchased for 30 cents per sheet.

Applications published under the Defensive Publication Program have not been examined as to the merits of alleged invention. The Patent Office makes no assertion as to the novelty of the disclosed subject matter.

PUBLISHED JULY 29, 1969

864 O.G. 1406

811,578

PROCESS OF RECLAIMING USED DEVELOPER COMPOSITIONS

Howard A. Miller, % Kodak Park Works, Rochester, N.Y. 14650

Filed Mar. 28, 1969. Published July 29, 1969
Int. Cl. B03d *3/00;* B03b *1/00;* B03c *1/00*
U.S. Cl. 252—62.1
No Drawing. 18 Pages Specification

A process is disclosed for separating dry electrostatic developer compositions into the respective carrier and toner components. This process involves first wetting the used developer composition with an excess of liquid which has a low surface tension and which is electrically conducting. Preferably, the surface tension of the liquid is less than about 55 dynes/cm. as measured against air and has an electrical conductivity of greater than about $10^{-9}$ mho/cm. This conducting liquid wets the surface of the toner and carrier particles and neutralizes the triboelectric charges holding these particles together. The toner and carrier particles are then quantitatively separated by suitable physical means. Separation can be accomplished through the use of centrifugal force. Another suitable means for separation involves the use of a treating liquid having a specific gravity intermediate of the specific gravity of the carrier and of the toner. According to this method, the heavier carrier particles will settle to the bottom and the lighter weight toner particles will rise to the top of the liquid. In addition, when magnetically responsive carriers are involved separation can be accomplished with magnetic means.